March 7, 1961 D. A. FLUEGEL 2,973,638
ENGINE ANALYSIS APPARATUS
Filed July 14, 1955 2 Sheets-Sheet 1
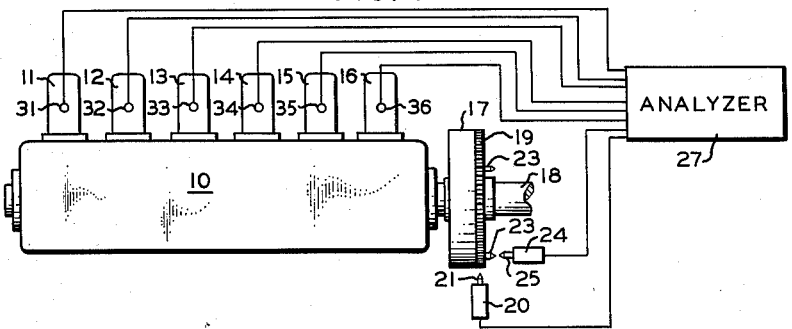
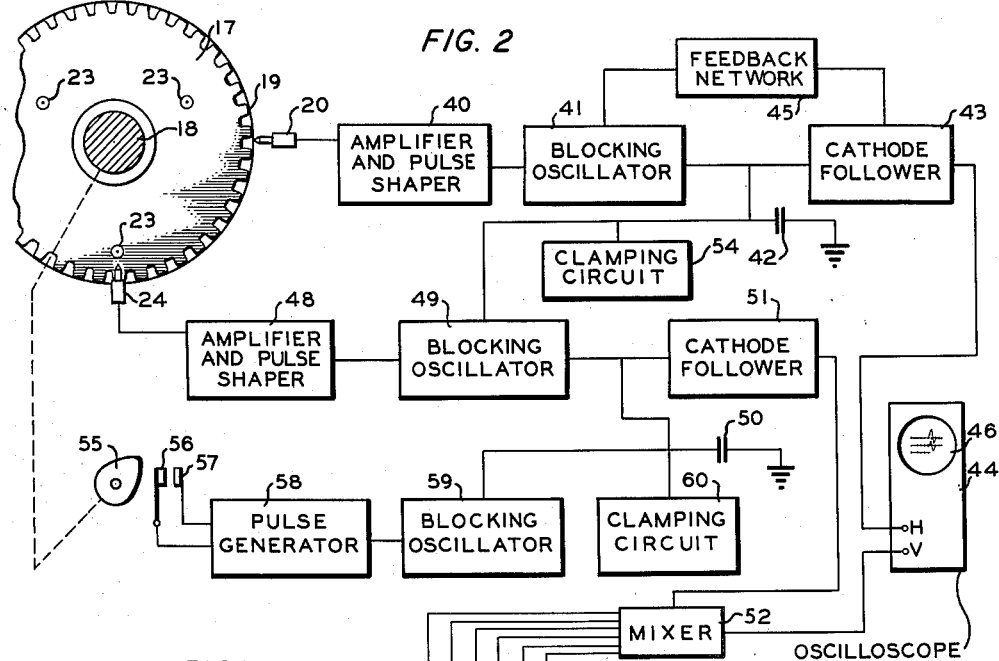
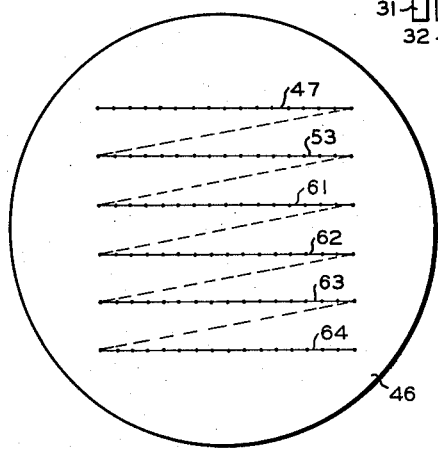
INVENTOR.
D. A. FLUEGEL
BY Hudson & Young
ATTORNEYS

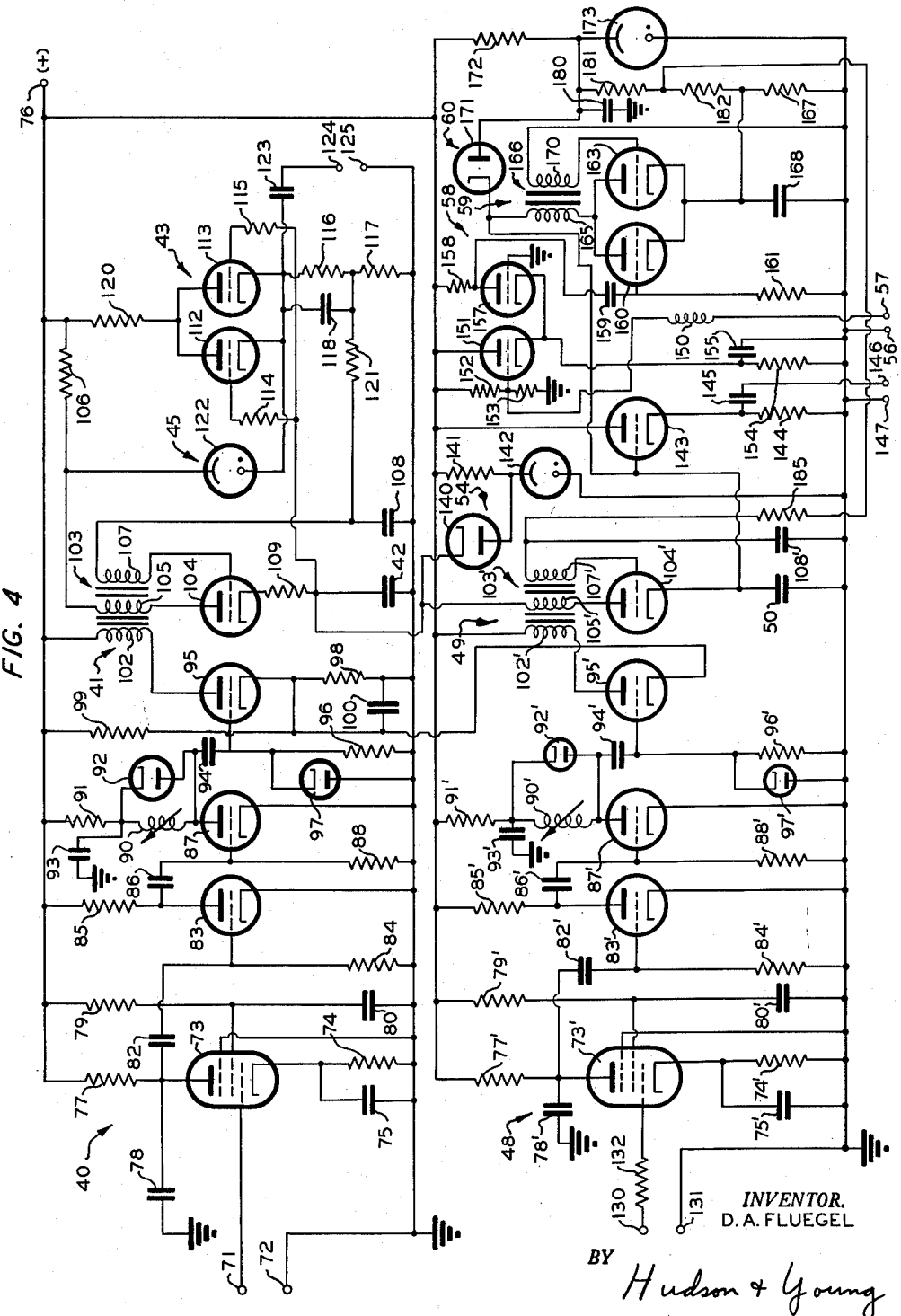

United States Patent Office 2,973,638
Patented Mar. 7, 1961

2,973,638

ENGINE ANALYSIS APPARATUS

Dale A. Fluegel, Bartlesville, Okla., assignor to Phillips Petroleum Company, a corporation of Delaware Filed July 14, 1955, Ser. No. 522,035

8 Claims. (Cl. 73—35)

This invention relates to apparatus for testing internal combustion engines. In another aspect it relates to apparatus to synchronize the sweep of a cathode ray oscilloscope with a rotating body.

It is known in the art to test internal combustion engines to determine properties such as detonation by means of a cathode ray oscilloscope. The oscilloscope comprises a cathode ray tube wherein a beam of electrons impinges upon a fluorescent screen. A first pair of deflection plates is provided to displace the electron beam horizontally and a second pair of deflection plates is provided to displace the electron beam vertically. The horizontal movement of the electron beam normally is controlled by a relaxation oscillator which is connected to the horizontal deflection plates to move the electron beam slowly across the screen and to return the beam rapidly to its initial starting point. It is common practice to synchronize the relaxation oscillator with the engine so that the horizontal sweep starts at a predetermined portion of the engine cycle. Normally this synchronization is obtained from an ignition pulse. In testing engines by apparatus of this type, means are provided to generate an electrical signal representative of the quantity being tested. For example, a magnetostrictive element can be attached to a cylinder to generate pulses representative of detonation. These pulses are applied to the vertical deflection plates of the cathode ray oscilloscope to deflect the electron beam vertically in a manner representative of the condition being measured.

The present invention is directed primarily toward providing an improved synchronization system for use with engine testing apparatus of the general type described. The apparatus of this invention provides a plurality of horizontal traces on a cathode ray oscilloscope which are synchronized with the position of the engine crank shaft rather than with ignition pulses. This system enables a more accurate determination to be made of the time of occurrence of the condition being measured because no provision need be made for spark advancement. The horizontal deflection of the electron beam is controlled by the charge on a first capacitor. This capacitor is charged stepwise by pulses which are generated by rotation of the engine crank shaft through predetermined relatively small angles. The crank shaft can be provided with a toothed flywheel constructed of magnetic material. A first coil is positioned adjacent the flywheel so that a voltage pulse is induced therein as each tooth moves past the coil. These pulses energize a first blocking oscillator which charges the first capacitor in a stepwise fashion. A second capacitor is connected across the vertical deflection plates of the oscilloscope to control vertical movement of the electron beam. This second capacitor is also charged in a stepwise fashion by a similar circuit which is energized from a second coil mounted adjacent the flywheel. A plurality of studs are positioned on the flywheel to generate pulses in the second coil. In testing an ordinary internal combustion engine there are provided one-half as many studs as cylinders in the engine. The circuit employed to charge the second capacitor discharges the first capacitor to reset the horizontal trace periodically. A third pulse generating circuit is associated with the crank shaft to discharge the second capacitor at the end of a predetermined number of revolutions. This restores both the horizontal and vertical traces to the initial position. A signal representative of the condition to be measured is superimposed upon the vertical deflection plates to provide an indication of this condition on the oscilloscope.

Accordingly, it is an object of this invention to provide improved apparatus for testing internal combustion engines.

Another object is to provide apparatus to synchronize a cathode ray oscilloscope with the position of a rotating body.

A further object is to provide cathode ray oscilloscope sweep voltages which are synchronized with a rotating body and which are of constant amplitude irrespective of the speed of rotation.

A further object is to provide apparatus for use in analyzing an internal combustion engine which permits a plurality of cylinders to be observed accurately on a single cathode ray oscilloscope.

Other objects, advantages and features of the invention should become apparent from the following detailed description taken in conjunction with the accompanying drawing in which:

Figure 1 is a schematic representation of an internal combustion engine having the analysis apparatus of the present invention associated therewith;

Figure 2 is a schematic diagram of the apparatus of this invention;

Figure 3 is an illustration of the cathode ray oscilloscope sweep provided by the apparatus of this invention; and Figure 4 is a detailed circuit diagram of the apparatus of this invention.

Referring now to the drawing in detail, and to Figure 1 in particular, there is shown an internal combustion engine 10 having six cylinders 11, 12, 13, 14, 15 and 16. A flywheel 17 is mounted on the crank shaft 18. A portion of flywheel 17 is provided with a plurality of teeth 19 which revolve adjacent a pickup element 20. Element 20 comprises a coil enclosing a core 21 of magnetic material. Teeth 19 also are formed of magnetic material so that a voltage pulse is induced across the end terminals of the coil of element 20 each time one of the teeth moves past core 21. A plurality of studs 23 of magnetic material is mounted on flywheel 17 to move past a pickup element 24 when the flywheel is rotated. Pickup element 24 also comprises a coil surrounding a core 25 of magnetic material. Pickup elements 20 and 24 are connected to an analyzer circuit 27. Cylinders 11 to 16 are provided with respective detecting elements 31 to 36 which generate electrical signals representative of the condition to be tested in the cylinders. For example, these pickups can be magnetostrictive elements which provide voltage pulses representative of detonation vibrations in the cylinders. The pickups 31 to 36 are also connected to analyzer circuit 27.

Analyzer circuit 27 is illustrated schematically in Figure 2. The pulses induced across the coil of element 20 are of substantially sinusoidal wave form. These pulses are applied to the input of an amplifier and pulse shaper 40 which provides sharp output pulses of a given polarity. These sharp pulses are applied to a blocking oscillator 41 to initiate oscillations. Oscillator 41 provides an output pulse each time an input pulse is supplied thereto. These output pulses increase the charge on a capacitor 42 by a predetermined amount. The charge on capacitor 42 is applied through a cathode follower 43 to the horizontal deflection plates of oscilloscope 44. A portion of the output signal from cathode follower 43 is applied through a feedback network 45 to blocking oscillator 41 to maintain the output pulses of the oscillator of constant magnitude irrespective of the charge on capacitor 42. Capacitor 42 is thus charged to successively higher voltages as teeth 19 move past pickup element 20. The charge on capacitor 42 deflects the electron beam in oscilloscope 44 horizontally across the face of the screen as illustrated by horizontal line 47 in Figure 3. Each output pulse of oscillator 41 rapidly increases the charge on capacitor 42 which in turn moves the electron beam. The beam then remains stationary until the following pulse is applied to capacitor 42. This results in a series of dots in the horizontal trace which serve to identify the exact position of flywheel 17.

For each complete cycle of engine 10, crank shaft 18 makes two revolutions. In order to increase the effective length of the horizontal sweep on the oscilloscope a separate horizontal trace is drawn to represent each individual cylinder. The horizontal trace defined by line 47 is repeated at the end of one third of a revolution of crank shaft 18. This is accomplished by studs 23 and pickup element 24. Each time a stud 23 moves past pickup element 24 a pulse is applied to the input of an amplifier and pulse shaper 48. The output pulse from this unit is applied to a second blocking oscillator 49 which in turn charges a second capacitor 50. The charge on capacitor 50 is applied through a cathode follower 51 and a mixer 52 to the vertical deflection plates on oscilloscope 44. Pickups 31 to 36 are also applied to respective inputs of mixer 52. The pulses generated by these pickups are superimposed on the vertical deflection plates of oscilloscope 44. The charge on capacitor 50 moves the electron beam in oscilloscope 44 downwardly to the position indicated by line 53. The output pulse from blocking oscillator 49 is also applied to capacitor 42 to discharge this capacitor to a reference potential which is maintained by a clamping circuit 54. This restores the electron beam to the left end of line 53.

A cam 55 is mechanically coupled to crank shaft 18 to close a pair of contacts 56 and 57 at the end of each two revolutions of the crank shaft. Contacts 56 and 57 are thus closed after six of the foregoing cycles. Closure of these contacts results in a pulse being generated by a pulse generator 58 which energizes a third blocking oscillator 59. Blocking oscillator 59 discharges capacitor 50 to a reference potential which is maintained by a clamping circuit 60. After six horizontal traces 47, 53, 61, 62, 63 and 64, the electron beam is moved back to the left end of horizontal line 47. The sequence of operations thus far described then repeats.

The circuit of Figure 2 is illustrated in detail in Figure 4. Input terminals 71 and 72 are connected to the respective end terminals of the coil of pickup element 20. Terminal 71 is connected to the control grid of a pentode 73 and terminal 72 is connected to ground. The cathode of pentode 73 is connected to ground through a resistor 74 which is shunted by a capacitor 75. The anode of pentode 73 is connected to a positive potential terminal 76 through a resistor 77. A capacitor 78 is connected between the anode of pentode 73 and ground. The suppressor grid of the pentode is connected directly to ground, and the screen grid is connected to terminal 76 through a resistor 79 and to ground through a capacitor 80. The anode of pentode 73 is also connected through a capacitor 82 to the control grid of a triode 83. The control grid of triode 83 is connected to ground through a resistor 84. The cathode of triode 83 is connected directly to ground and the anode thereof is connected to terminal 76 through a resistor 85. The anode of triode 83 is also connected through a capacitor 86 to the control grid of a triode 87. The control grid of triode 87 is connected to ground through a resistor 88. The cathode of triode 87 is connected directly to ground. The anode of this triode is connected to terminal 76 through a variable inductor 90 and a resistor 91 which are connected in series relationship. A diode 92 is connected in parallel with inductor 90, the cathode of the diode being connected to the junction between inductor 90 and resistor 91. A capacitor 93 is connected between this junction and ground. The anode of triode 87 is also connected through a capacitor 94 to the control grid of a triode 95. The control grid of triode 95 is connected to ground through a resistor 96 which is shunted by a diode 97, the anode of the diode being connected to ground. The cathode of triode 95 is connected to ground through a resistor 98 and to terminal 76 through a resistor 99. A capacitor 100 is connected in parallel relationship with resistor 98.

The anode of triode 95 is connected to terminal 76 through the first winding 102 of a transformer 103. The anode of a triode 104 is connected through a second winding 105 of transformer 103 and a resistor 106 to terminal 76. The control grid of triode 104 is connected through the third winding 107 of transformer 103 and a capacitor 108 to ground. The cathode of triode 104 is connected through a resistor 109 to the first terminal of capacitor 42. The second terminal of capacitor 42 is connected to ground. The junction between resistor 109 and capacitor 42 is connected to the control grids of triodes 112 and 113 through respective resistors 114 and 115. The cathodes of these two triodes are connected to one another and to ground through series connected resistors 116 and 117. A capacitor 118 is connected in parallel relationship with resistor 116. The anodes of triodes 112 and 113 are connected to one another and to terminal 76 through a resistor 120. The junction between resistors 116 and 117 is connected through a resistor 121 to the junction between transformer winding 107 and capacitor 108. The connected cathodes of triodes 112 and triodes 113 are connected through a voltage regulator tube 122 to the junction between resistor 106 and transformer winding 105. The cathodes of triodes 112 and 113 are also connected through a capacitor 123 to a first output terminal 124. The second output terminal 125 is connected to ground. Terminals 124 and 125 are connected to the horizontal amplifier input of oscilloscope 44, either directly or through an amplifier, not shown.

The voltage pulses induced across the coil of pickup element 20 are of substantially sinusoidal wave form. These pulses are amplified by pentode 73 and triode 83. The output pulses from triode 83 more nearly approach a square wave than a sinusoidal wave. These pulses energize the pulse shaping circuit which includes triode 87 having inductor 90 in the anode circuit thereof. The output pulses from this triode are differentiated by the circuit comprising capacitor 94 and resistor 96. Diodes 92 and 97 eliminate the negative pulses so that only positive pulses are applied to the control grid of triode 95. These pulses trigger the blocking oscillator formed by triode 104 and its associated circuit. Triode 104 conducts only when a pulse is applied to the grid thereof. Conduction by triode 104 results in capacitor 42 being charged. This procedure continues as each pulse is applied to the blocking oscillator so that the voltage across capacitor 42 increases in a stepwise fashion. The voltage across capacitor 42 is applied to the control grids of triodes 112 and 113 which fashion as parallel cathode followers. The output signal from these two triodes is applied to the horizontal deflection plates of the oscilloscope.

As capacitor 42 is charged to successively higher voltages the potential difference between the anode and cathode of triode 104 tends to diminsh. Unless some provision is made to compensate for this factor, conduction through the triode tends to decrease for each subsequent incoming pulse. This tends to result in a non-linear horizontal sweep on the oscilloscope. In order to overcome this difficulty, a feedback network 45 is connected between the output of cathode follower 43 and the oscillator 41. The voltage on the cathodes of triodes 112 and 113 is applied through voltage regulating tube 122 to the anode of triode 104 so that the voltage on the anode of this triode increases as the charge on capacitor 42 increases. The voltage on the cathodes of triodes 112 and 113 is also applied through a feedback resistor 121 and transformer winding 107 to the control grid of triode 104 so that the control grid bias is maintained in proper proportion to the anode and cathode bias. In this manner the charge on capacitor 42 is increased substantially linearly with each incoming pulse irrespective of the initial charge on the capacitor.

Input terminals 130 and 131 are connected to the respective end terminals of the coil of pickup element 24. Terminal 130 is connected through a resistor 132 to the control grid of a pentode 73'. Terminal 131 is connected to ground. Pulse generator 48 and blocking oscillator 49 are substantially identical to the corresponding amplifier 40 and oscillator 41 previously described. These elements are illustrated in detail in Figure 4 by corresponding primed reference numerals.

The anode of triode 104' is connected through transformer winding 105' to the junction between capacitor 42 and resistor 109. Thus, conduction by triode 104' responsive to an input pulse being applied thereto results in the discharge of capacitor 42. The cathode of a diode 140 is connected to the junction between capacitor 42 and resistor 109. The anode of diode 140 is connected through a resistor 141 to terminal 76. Diode 140 thus functions to prevent capacitor 42 from being discharged below a reference voltage level. Conduction by triode 104' also charges capacitor 50. The junction between capacitor 50 and the cathode of triode 104' is connected to the control grid of a triode 143. The anode of triode 143 is connected to terminal 76, and the cathode thereof is connected to ground through a resistor 144. A capacitor 145 is connected between the cathode of triode 143 and an output terminal 146. An output terminal 147 is connected to ground. These two terminals are connected to the vertical deflection plates of oscilloscope 44 through mixer circuit 52 so that the vertical deflection of the electron beam in the oscilloscope is controlled by the potential on capacitor 50. Triode 143 represents cathode follower 51 of Figure 2.

The charge on capacitor 50 normally does not increase sufficiently to require a feedback network such as provided in conjunction with blocking oscillator 41. However, such a network can be provided if needed or desired.

Terminal 56 is connected to ground and terminal 57 is connected through an inductor 150 to the control grid of a triode 151. The control grid of triode 151 is connected to terminal 76 through a resistor 152 and to ground through a resistor 153. The cathode of triode 151 is connected to ground through a resistor 154 which is shunted by a capacitor 155. The anode of triode 151 is connected to terminal 76. Triode 151 is normally biased so that the tube conducts in the absence of terminals 56 and 57 being closed. Closure of these contacts results in the control grid of triode 151 being grounded which diminishes or extinguishes conduction by triode 151. The cathode of triode 151 is connected to the cathode of a triode 157. The control grid of triode 157 is connected to ground. The anode of triode 157 is connected through a resistor 158 to terminal 76 and through a capacitor 159 to the control grid of a triode 160. The control grid of triode 160 is connected to ground through a resistor 161. The anode of triode 160 is connected to the anode of a triode 163 and to the cathode of triode 104' through a winding 165 of a transformer 166. The cathodes of triodes 160 and 163 are connected to one another and to ground through a resistor 167 which is shunted by a capacitor 168. The control grid of triode 163 is connected to ground through the second winding 170 of transformer 166. Output pulses from triode 157 thus energize blocking oscillator 59 so that conduction through triodes 160 and 163 discharges capacitor 50. The junction between capacitor 50 and the cathode of triode 104' is connected to the cathode of a diode 171. The anode of diode 171 is connected through a resistor 172 to terminal 76 and through a voltage regulating tube 173 to ground. This maintains the potential on the anode of diode 171 at a fixed value so that capacitor 50 is not discharged below a reference potential. A capacitor 180 is connected between the anode of diode 171 and ground.

In one particular embodiment of this invention the following circuit components were employed:

| Resistor: | Value |
|---|---|
| 77 ohms | 470,000 |
| 77' do | 470,000 |
| 74 do | 1,800 |
| 74' do | 1,800 |
| 85 do | 150,000 |
| 85' do | 150,000 |
| 84 do | 510,000 |
| 91 do | 33,000 |
| 91' do | 33,000 |
| 96 do | 120,000 |
| 96' do | 120,000 |
| 98 do | 4,700 |
| 109 do | 560 |
| 106 do | 4,700 |
| 120 do | 100 |
| 114 do | 150 |
| 115 do | 150 |
| 121 do | 1,000 |
| 116 do | 2,000 |
| 117 do | 6,600 |
| 185 do | 1,200 |
| 141 do | 20,000 |
| 152 do | 270,000 |
| 153 do | 12,000 |
| 158 do | 220,000 |
| 154 do | 27,000 |
| 161 do | 220,000 |
| 172 do | 56,000 |
| 181 do | 18,000 |
| 182 do | 56,000 |
| 167 do | 8,200 |
| 79 megohms | 1 |
| 79' do | 1 |
| 84' do | 10 |

| Tube: | Type |
|---|---|
| 73 | 6AU6 |
| 73' | 6AU6 |
| 83 and 87 | 12AT7 |
| 83' and 87' | 12AT7 |
| 95 and 95' | 12AT7 |
| 104 and 104' | 12AU7 |
| 112 and 113 | 5687 |
| 92 | IN34–A |
| 97 | IN34–A |
| 92' | IN34–A |
| 97' | IN34–A |
| 143 | ½ 12AU7 |
| 151 and 157 | 12AT7 |
| 160 and 163 | 12AT7 |
| 122 | OB2 |
| 142 | OA2 |
| 171 | ½ 6AL5 |
| 173 | 5651 |
| 140 | ½ 6AL5 |

| Capacitor: | | Value |
|---|---|---|
| 78 | micro-microfarads | 250 |
| 82 | do | 250 |
| 86 | do | 500 |
| 94 | do | 100 |
| 78' | do | 470 |
| 86' | do | 500 |
| 94' | do | 100 |
| 80 | microfarads | 0.02 |
| 100 | do | 0.01 |
| 42 | do | 0.02 |
| 123 | do | 0.22 |
| 82' | do | 0.01 |
| 93 | do | 0.1 |
| 93' | do | 0.1 |
| 108 | do | 0.005 |
| 50 | do | 1.0 |
| 108' | do | 0.05 |
| 155 | do | 0.047 |
| 159 | do | 0.001 |
| 75 | do | 10 |
| 75' | do | 10 |
| 118 | do | 500 |
| 145 | do | 4 |
| 168 | do | 10 |
| 180 | do | 4 |

| Inductor: | | Value |
|---|---|---|
| 90 | millihenries | 5–43 |
| 90' | do | 5–43 |
| 150 | do | 2.5 |

Terminal 76 was maintained at 330 volts. Gear 19 had a sufficient number of teeth so that a pulse was introduced in element 20 during each two degrees of revolution of the crank shaft.

While the invention has been described in conjunction with a present preferred embodiment, it should be evident that it is not limited thereto.

What is claimed is:

1. Internal combustion engine analyzing apparatus comprising first means responsive to rotation of the drive shaft of an engine to establish a first voltage pulse each time said drive shaft rotates through a first predetermined angle comprising a plurality of spaced first members of magnetic material carried by said drive shaft, a first coil positioned adjacent said shaft so that said first members move past said first coil in sequence as said shaft rotates, means to provide a first sharp pulse representative of the voltage pulse induced in said first coil as one of said members moves past said first coil, a first blocking oscillator, and means to energize said first blocking oscillator by said first sharp pulses; a cathode ray oscilloscope having first and second pairs of deflection plates at right angles to one another; first and second capacitors; means connected to said first capacitor and to said first pair of deflection plates for applying across the latter a voltage representative of the voltage across said first capacitor; means responsive to the output of said first blocking oscillator to charge said first capacitor to successively higher voltages; second means responsive to rotation of said drive shaft to establish a second voltage pulse each time said drive shaft rotates through a second predetermined angle greater than said first predetermined angle comprising a plurality of spaced second members of magnetic material carried by said drive shaft, a second coil positioned adjacent said shaft so that said second members move past said second coil in sequence as said first shaft rotates, means to provide a second sharp pulse representative of the voltage pulse induced in said second coil as one of said second members moves past said second coil, a second blocking oscillator, and means to energize said second blocking oscillator by said second sharp pulses; means responsive to the output of said second blocking oscillator to charge said second capacitor to successively higher voltages and to discharge said first capacitor to a predetermined reference voltage; means connected to said second capacitor and to said second pair of deflection plates for applying across the latter a voltage representative of the voltage across said second capacitor; third means responsive to rotation of said drive shaft to establish a third voltage pulse each time said drive shaft rotates through a third predetermined angle greater than said second predetermined angle; and means responsive to said third voltage pulses to discharge said second capacitor to a predetermined reference voltage.

2. The combination in accordance with claim 1 further comprising means responsive to the voltage across said first capacitor to adjust the bias potentials supplied to said first blocking oscillator so that conduction by said first blocking oscillator responsive to said first sharp pulses remains substantially constant irrespective of the charge on said first capacitor.

3. Internal combustion engine analyzing apparatus comprising a wheel secured to the drive shaft of the engine to be analyzed; a plurality of teeth of magnetic material secured to and spaced about the periphery of said wheel; a first coil positioned adjacent said wheel so that a voltage pulse is generated across said first coil each time one of said teeth moves past said first coil; a cathode ray oscilloscope having two pairs of deflection plates at right angles to one another; a first capacitor; means connecting the terminals of said first capacitor to the first pair of said deflection plates, respectively; circuit means responsive to pulses generated across said first coil to charge said first capacitor to successively higher voltages as said teeth move past said first coil; a plurality of members of magnetic material secured to said wheel in spaced relationship with one another; a second coil positioned adjacent said wheel so that a voltage pulse is generated across said second coil each time one of said members moves past said second coil; a second capacitor; means connecting the terminals of said second capacitor to the second pair of said deflection plates, respectively; circuit means responsive to pulses generated across said second coil to charge said second capacitor to successively higher voltages and to discharge said first capacitor to a reference voltage as said members move past said second coil; means responsive to rotation of said wheel to establish a third pulse each time said wheel completes a predetermined number of revolutions comprising a blocking oscillator, a pair of normally open contacts, means connected to the drive shaft of said engine to close said contacts each time said drive shaft completes a predetermined number of revolutions, and circuit means including said contacts to energize said blocking oscillator each time said contacts are closed; and means responsive to said third pulses to discharge said second capacitor to a predetermined voltage.

4. The combination in accordance with claim 3 further comprising means secured to a cylinder of the engine being analyzed to provide fourth voltage pulses representative of detonation in the cylinder, and means to apply voltages acorss said second pair of deflection plates representative of said fourth voltage pulses.

5. The combination in accordance with claim 3 wherein said circuit means comprises a vacuum tube, means normally biasing said tube so that said tube normally conducts, means responsive to closure of said contacts to change the bias on said tube to diminish conduction by said tube, and means responsive to diminished conduction by said tube to energize said blocking oscillator.

6. Internal combustion engine analyzing apparatus comprising first means responsive to rotation of the drive shaft of the engine to establish a first voltage pulse each time said drive shaft rotates through a first predetermined angle, a cathode ray oscilloscope having first and second pairs of deflection plates at right angles to one another, first and second capacitors, a first cathode follower connected to apply a voltage across the first pair of deflection plates of said oscilloscope which is proportional to the charge on said first capacitor, a second cathode follower connected to apply a voltage across the second pair of deflection plates of said oscilloscope which is proportional to the charge on said second capacitor, a first blocking oscillator, means responsive to said first voltage pulses to energize said first blocking oscillator, means to charge said first capacitor responsive to said first blocking oscillator being energized, second means responsive to rotation of said drive shaft to establish a second voltage pulse each time said drive shaft rotates through a second predetermined angle greater than said first predetermined angle, a second blocking oscillator, means responsive to said second voltage pulses to energize said second blocking oscillator, means to charge said second capacitor responsive to said second blocking oscillator being energized, means to discharge said first capacitor responsive to said second blocking oscillator being energized, a first clamping circuit to limit the voltage to which said first capacitor is discharged, third means responsive to rotation of said drive shaft to establish a third voltage pulse each time said drive shaft rotates through a third predetermined angle greater than said second predetermined angle, a third blocking oscillator, means responsive to said third voltage pulses to energize said third blocking oscillator, means to discharge said second capacitor responsive to said third blocking oscillator being energized, and a second clamping circuit to limit the voltage to which said second capacitor is discharged.

7. The combination in accordance with claim 6 further comprising means secured to a cylinder of the engine being analyzed to provide fourth voltage pulses representative of detonation in the cylnider, and means to apply voltages across said second pair of deflection plates representative of said fourth voltage pulses.

8. The combination in accordance with claim 6 further comprising means responsive to the voltage across said first capacitor to adjust the bias potentials supplied to said first blocking oscillator so that conduction by said first blocking oscillator responsive to said first sharp pulses remains substantially constant irrespective of the charge on said first capacitor.

References Cited in the file of this patent

UNITED STATES PATENTS

| | | |
|---|---|---|
| 2,608,093 | Traver | Aug. 26, 1952 |
| 2,688,126 | Weller | Aug. 31, 1954 |
| 2,688,127 | Sargeant et al. | Aug. 31, 1954 |